United States Patent
Sonnenberg et al.

(10) Patent No.: US 6,695,347 B2
(45) Date of Patent: Feb. 24, 2004

(54) SELF-ADJUSTING TETHER STRAP FOR INFLATABLE CURTAIN

(75) Inventors: John Sonnenberg, Holly, MI (US); Robert F. McGee, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 100 days.

(21) Appl. No.: 09/997,569

(22) Filed: Nov. 29, 2001

(65) Prior Publication Data

US 2003/0098573 A1 May 29, 2003

(51) Int. Cl.[7] ............................................... B60R 21/22
(52) U.S. Cl. ................................. 280/743.2; 280/730.2
(58) Field of Search ......................... 280/743.2, 743.1, 280/730.2, 730.1, 749, 728.2

(56) References Cited

U.S. PATENT DOCUMENTS

| | | | |
|---|---|---|---|
| 5,941,564 A | | 8/1999 | Acker |
| 6,010,149 A | | 1/2000 | Riedel |
| 6,135,490 A | * | 10/2000 | Spary ...................... 280/730.2 |
| 6,152,481 A | | 11/2000 | Webber |
| 6,176,515 B1 | * | 1/2001 | Wallner et al. .......... 280/730.2 |
| 6,203,058 B1 | | 3/2001 | Elqadah |
| 6,237,939 B1 | * | 5/2001 | Resh ...................... 280/730.2 |
| 6,273,458 B1 | * | 8/2001 | Steffens et al. .......... 280/730.2 |
| 6,290,253 B1 | | 9/2001 | Tietze |
| 6,308,982 B1 | * | 10/2001 | Wallner et al. .......... 280/730.2 |
| 6,367,836 B1 | | 4/2002 | Tanase |
| 6,375,214 B1 | * | 4/2002 | Nishikaji ................. 280/728.2 |
| 6,375,216 B1 | * | 4/2002 | Eschbach ................. 280/730.1 |
| 6,419,268 B1 | * | 7/2002 | Webert ..................... 280/743.2 |
| 6,464,250 B1 | * | 10/2002 | Faigle et al. ............. 280/730.2 |
| 6,505,853 B2 | * | 1/2003 | Brannon et al. ......... 280/730.2 |
| 2003/0001364 A1 | * | 1/2003 | Welch et al. ............ 280/730.2 |

FOREIGN PATENT DOCUMENTS

GB         2324068         4/1997

* cited by examiner

Primary Examiner—David R. Dunn
(74) Attorney, Agent, or Firm—Sally J. Brown; James D. Erickson

(57) ABSTRACT

An air-bag arrangement for use in a motor vehicle is often secured to the vehicle at points extending along a non-linear line located above an opening in the vehicle. The arrangement incorporates an inflatable element, connectors to secure an edge part of the inflatable element to the vehicle, and an inflator to inflate the inflatable element. The air-bag arrangement also incorporates a tether arrangement including a tether of elongated form having first end secured to the inflatable element adjacent the connectors and the second end secured to the vehicle. The tether movably passes through a guide located adjacent one end and the lower region of the inflatable element. Advantageously, when the inflatable element is inflated, a lower region of the inflatable element is taut and, together with the tether, extends between the two opposed ends of the non-linear line.

22 Claims, 5 Drawing Sheets

SELF-ADJUSTING TETHER STRAP FOR INFLATABLE CURTAIN

BACKGROUND OF THE INVENTION

1. Field of the Invention

The present invention relates to an air-bag arrangement. More specifically, the present invention relates to an air-bag arrangement for use in a motor vehicle, such as an automobile.

2. Description of Related Art

There have been many proposals concerning air-bag arrangements to be utilized in motor vehicles, such as automobiles. In particular, it has been proposed to provide an air-bag arrangement in the form of an inflatable curtain that, when inflated, is located adjacent a driver or occupant of a vehicle, being positioned between the driver or occupant of the vehicle and the adjacent door or window opening.

Typically, an inflatable curtain of this type is initially stored within a housing or recess that follows a non-linear path across the top of the doorframe of the motor vehicle. The forward end of the recess or housing may extend down the "A"-Post of the motor vehicle, and the rear end of the recess or housing may extend partly down the "C"-Post or a post located to the rear of the "C"-Post.

In the event that an accident should occur, typically a side-impact or roll-over accident, the air-bag within the housing or recess is inflated, and the air-bag then forms a curtain extending parallel with the longitudinal axis of the vehicle. The curtain is substantially vertical and extends from the roof line, above the door or window opening, to a position located at the lower edge of the window opening or substantially in alignment with the center of the chest of the driver or occupant of the vehicle.

In many accident situations, the window glass is broken during the very first moments of the accident. Consequently, the inflatable curtain itself must have the necessary characteristics to retain the head, arms, and hands of the driver or occupant within the motor vehicle. Therefore, it is desirable for the lower-most region of such an inflatable curtain to be taut when the air-bag has been inflated, so that the complete side curtain constitutes a substantially rigid element that will prevent the head, arms, and hands of the driver or occupant of the vehicle from passing laterally outward through the window of the motor vehicle.

Various attempts have been made to develop a side curtain of this type that can be fabricated in such a way that when the side curtain is deployed, the lower-most region of the side curtain is substantially taut so that the curtain exhibits the desired characteristics.

One example proposes utilizing a strap that extends from the lower-most edge of the inflatable curtain, at a point adjacent one end of the inflatable curtain, to an anchoring point, for example on the "A"-Post of the motor vehicle. The strap in that example is inflatable so that the length of the strap may be reduced on deployment of the inflatable curtain. The length of the strap is such that the inflatable curtain, together with the strap in its fully extended condition, can be stored within the non-linear housing or recess that extends above the door opening and partway down the "A"-Post. However, on deployment of the inflatable curtain, the inflation of the strap causes the length of the strap to be reduced, thus enabling the strap to apply a tensioning force to one end of the main inflatable part of the inflatable curtain pulling the curtain taut. The inflatable curtain itself typically incorporates a plurality of separate cells that have axes that generally intersect the lower edge of the inflatable curtain so that, on inflation of the inflatable cells, the overall length of the lower-most edge of the inflatable curtain is reduced, thus enhancing the tensioning effect.

The use of an inflatable strap is undesirable, since it is relatively expensive to fabricate an inflatable strap, and, on deployment of the inflatable curtain, the inflation of the strap consumes gas that could more usefully be employed in inflating the inflatable part of the inflatable curtain.

SUMMARY OF THE INVENTION

According to the present invention, there is provided an air-bag arrangement for use in a motor vehicle. The arrangement incorporates an inflatable element having an inflatable part, an edge part, an upper region, and a lower region, connectors to secure the edge part of the inflatable element to the motor vehicle, and an inflator adapted to inflate the inflatable part of the inflatable element. The arrangement also incorporates a tether arrangement including a tether of elongated form having first and second ends thereof. The first end is secured to part of the inflatable element adjacent the upper region of the inflatable element, and the second end is secured to the motor vehicle. The tether passes movably through a guide located adjacent one end of the inflatable element and adjacent the lower region of the inflatable element.

Preferably, the inflatable part of the inflatable element incorporates a plurality of discrete inflatable cells.

Conveniently, the guide comprises a slit, loop of material, or other guide device located adjacent the lower region of the inflatable element. The tether passes through the guide, with the tether and guide being so dimensioned that the tether may slide through the guide.

Advantageously, the tether has a catching portion adapted to permit the tether to move through the guide in one direction and to prevent the tether from moving through the guide in an opposite direction.

Preferably, the catching portion comprises a laterally outward extending projection formed on one side of the tether.

Conveniently, the air-bag arrangement may be mounted within a motor vehicle, an edge part of the inflatable element, together with the second end of the tether, being secured to the motor vehicle at points extending along a non-linear line located above an opening in the vehicle, the second end of the tether being secured to a point located adjacent one end of the non-linear line.

Advantageously, when the inflatable element is inflated, a lower region of the inflatable element and the tether extend between two opposed ends of the non-linear line, the lower region being substantially taut.

The invention also relates to an air-bag arrangement provided in a motor vehicle, the air-bag arrangement comprising a non-linear recess spanning at least one opening of the motor vehicle. The recess contains an initially folded inflatable element having an edge secured to the recess, an inflatable part, an upper region, and a lower region. The recess also contains a tether having first and second ends thereof. The tether's first end is secured to the inflatable element at a point adjacent said edge, and the second end is secured to the motor vehicle. The tether passes movably through a guide on the inflatable part of the inflatable element. The length of the tether is such that, in the initially folded condition, the inflatable element and the tether may be accommodated within the recess. The arrangement is such that, on inflation of the inflatable element, the guide on the inflatable part pulls the tether into a non-linear condition, the tether becoming stretched and taut, so that a lower part of the inflatable element, substantially aligned with a line interconnecting two ends of the non-linear recess, is substantially taut.

DETAILED DESCRIPTION OF THE PREFERRED EMBODIMENTS

Figure 1:
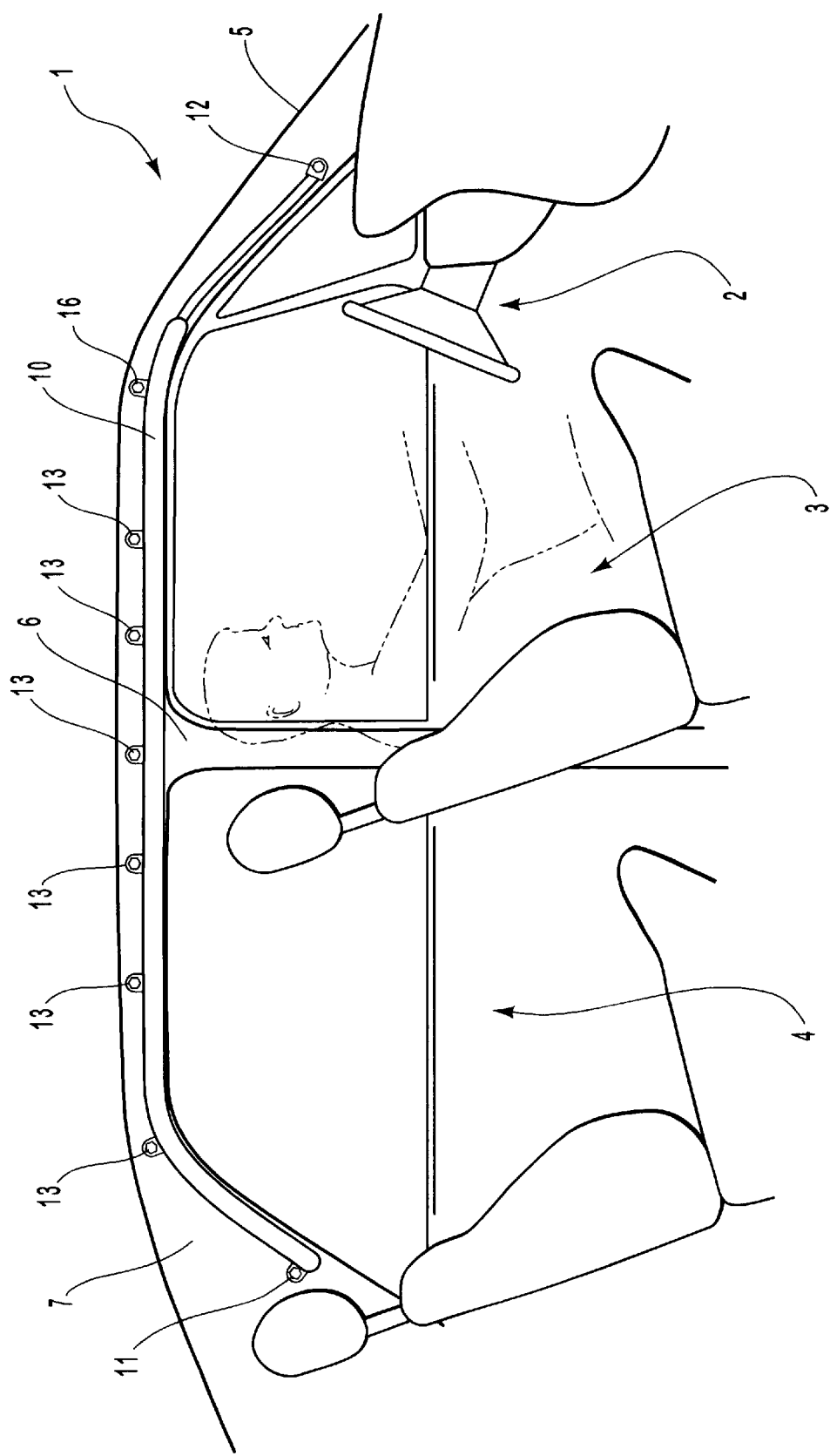
FIG. 1 is a diagrammatic view illustrating the interior of a motor vehicle, in the form of an automobile, provided with an air-bag arrangement in accordance with the invention, showing the air-bag arrangement in the undeployed state.

Referring to FIG. 1 of the accompanying drawings, part of a motor vehicle 1 is illustrated, the illustrated part of the vehicle incorporating a front door 2, located adjacent the driver of the vehicle 3, and a rear door 4. A window is provided in each door. An "A"-Post 5 is provided towards the front part of the front door 2. A "B"-Post 6 is provided between the front door 2 and the rear door 4, and a "C"-Post 7 is provided to the rear of the rear door 4.

A housing 10 is provided that spans from a point 11 on the "C"-Post 7, across the top of the rear door 4, across the top of the front door 2 and down the "A"-Post 5 to a point 12. The housing is non-linear.

The housing 10 is provided with a plurality of connectors 13, here embodied as anchoring tabs, which may be spaced along the length of the housing, each connector being secured to part of the roof of the motor vehicle 1 so that the housing 10 is retained in the illustrated position. The housing defines an internal recess that accommodates an air-bag.

The housing 10 contains, in an initial folded condition, an inflatable element 14, (see FIG. 2) and the forward most part of the housing contains a tether 15 that will be described hereafter in greater detail.

The inflatable element 14 has an inflatable part that is generally of rectangular form, and an edge part that has a non-linear upper edge. The upper edge of the edge part of the inflatable element 14 is secured to the roof of the vehicle 1 by the connectors 13 along a line that spans from the point 11 on the "C"-Post 7 of the motor vehicle, to a point 17 (see FIG. 2) located at the upper-most part of the "A"-Post 5.

The main inflatable part of the inflatable element 14 comprises two adjacent layers of fabric, selected regions of which may be inter-connected, preferably using a one-piece-weaving technique, to form seams that define a plurality of discrete inflatable cells. For example, towards the rear of the inflatable element 14, in the region 18, the inflatable element defines a plurality of substantially vertically extending, discrete inflatable cells 19. The cells 19 are arranged so that the longitudinal axis of each cell substantially intersects the lower-most edge 26 of the inflatable element. In an intermediate region 21, no cells are provided, and towards the front of the inflatable element 14, in a further region 22, again a plurality of adjacent, discrete inflatable cells 23 are provided. The cells 23 are arranged so that the axis of each cell intersects the lower-most edge 26 of the inflatable element 14.

The upper part of the inflatable element 14 is provided with a fill tube 24 that communicates with an inflator (not shown), such as a gas generator, adapted to be actuated in response to an accident, such as a side impact or roll-over accident. Suitable inflators are known to persons skilled in the art. The fill tube 24 also communicates with each of the cells 19 and 23, of the inflatable element 14.

Figure 2:
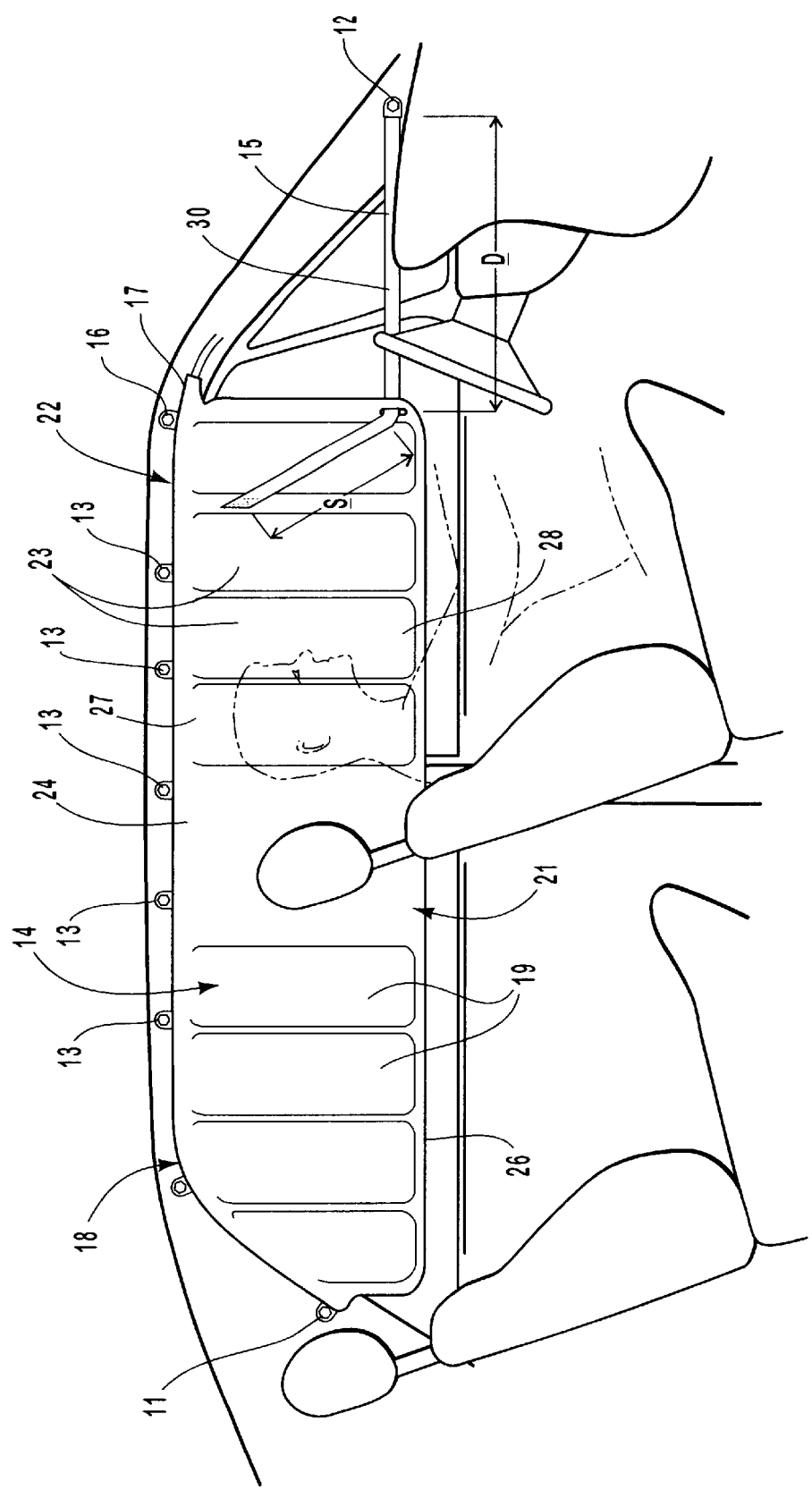
FIG. 2 is a view corresponding to FIG. 1, but illustrating the air-bag in the deployed state.
Figure 3:
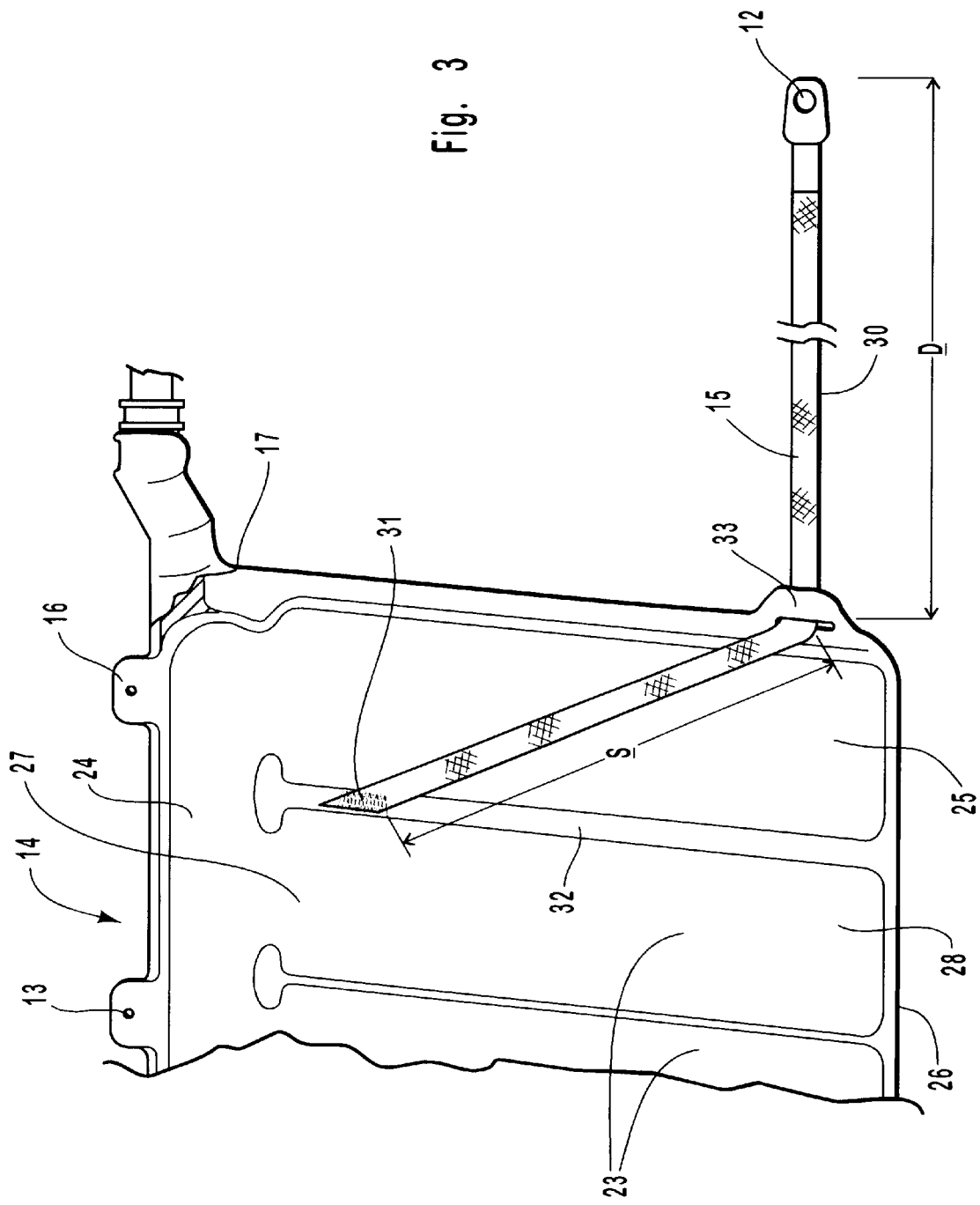
FIG. 3 is an enlarged view of part of FIG. 2, illustrating, more clearly, the tethering strap.

Referring to FIG. 3, the tether 15 provided towards the front of the inflatable element 14 is shown as an elongated strap 30. The tether 15 has one end secured to part of the inflatable element 14 adjacent an upper region 27 of the inflatable element. Thus, in the illustrated embodiment, the strap 30 has one end 31 secured at the forward end of the inflatable part of the inflatable element 14 to the upper-most part of a seam 32 that separates the first inflatable cell 25 from the adjacent inflatable cell 23. The strap 30, which is on the exterior of the inflatable element 14, passes around the first cell 25, whilst descending diagonally from the point at which the strap is connected to the seam 32. The strap then movably passes through a guide 33, shown in FIG. 3 as a slit, provided at the lower-most corner of the inflatable element 14, adjacent the first cell 25. The strap 30, as shown in FIG. 2, extends to the point 12 provided on the "A"-Post 5 of the motor vehicle.

The length of the tether 15 may be considered to be the length "S" plus the length "D." As shown in FIGS. 2 and 3, the distance "S" is the distance between the point at which the end 31 of the strap is secured to the seam 32 and the guide 33 when the inflatable element 14 is in the inflated condition. The distance "D" is the distance between the guide 33 and the point 12 formed on the "A"-Post 5 of the motor vehicle 1 when the inflatable element 14 is in the inflated condition. The combined distance "S" plus "D" is preferably short enough to cause the strap 30 to be stretched and taut when the inflatable element is in the inflated condition, thereby causing a lower region 28 of the inflatable element 14 to be substantially taut. The tautness in the lower region 28 of the inflatable element provides the inflated element with sufficient rigidity to maintain its position even if the adjacent windows break.

When the inflatable element 14 is in the initial condition, as shown in FIG. 1, the main inflatable part of the air-bag is folded and is stored within the housing 10. The connection between the end 31 of the strap 30 and the seam 32 is located adjacent the terminal connector 16 that secures the inflatable part of the inflatable element to the roof of the motor vehicle 1. The arrangement is such that the combined distance "S' plus "D" is slightly longer than the distance between this terminal connector 16 and the point 12 provided on the "A"-Post 5 of the motor vehicle where the housing terminates. Thus, the strap 30 may be accommodated within the housing 10 when the air-bag is in the un-inflated state.

On inflation of the air-bag, the first cell 25, located at the front of the inflatable part of the inflatable element 14, will inflate. It may be preferable if the first cell 25 is caused to inflate during the initial stages of inflation of the inflatable element. As cell 25 inflates, the guide 33, which is formed at the lowermost corner of the inflatable element 14, is moved downwardly sliding along the strap 30. Thus, the strap 30 is moved towards the condition illustrated in FIG. 3 in which, as has been mentioned above, an initial part of the strap, of length S, extends from the end 31 of the strap diagonally downwardly around the outer periphery of the inflated cell 25 before the strap passes through the guide 33 to extend substantially horizontally the distance "D" to the point 12 provided on the "A"-Post 5 of the motor vehicle 1. It will be appreciated that moving the strap to this condition tends to stretch the strap 30. As the cell 25 inflates, further stretching is applied to the part of the strap that extends along the exterior of the cell 25, since the cell 25 will itself tend to move towards a substantially cylindrical form as the cell becomes fully inflated. This will enhance the stretching and tautness of the strap 30 and the tautness of the lower region 28 of the inflated element 14.

When the inflatable element 14 is in the fully inflated condition, as shown in FIG. 2, a line of substantial tautness and rigidity exists between the point 11 on the "C"-Post 7 of the motor vehicle 1 and the point 12 of the "A"-Post 5 of the motor vehicle. Thus, the inflated element has sufficient rigidity to maintain its position even if the adjacent windows break.

Figure 4:
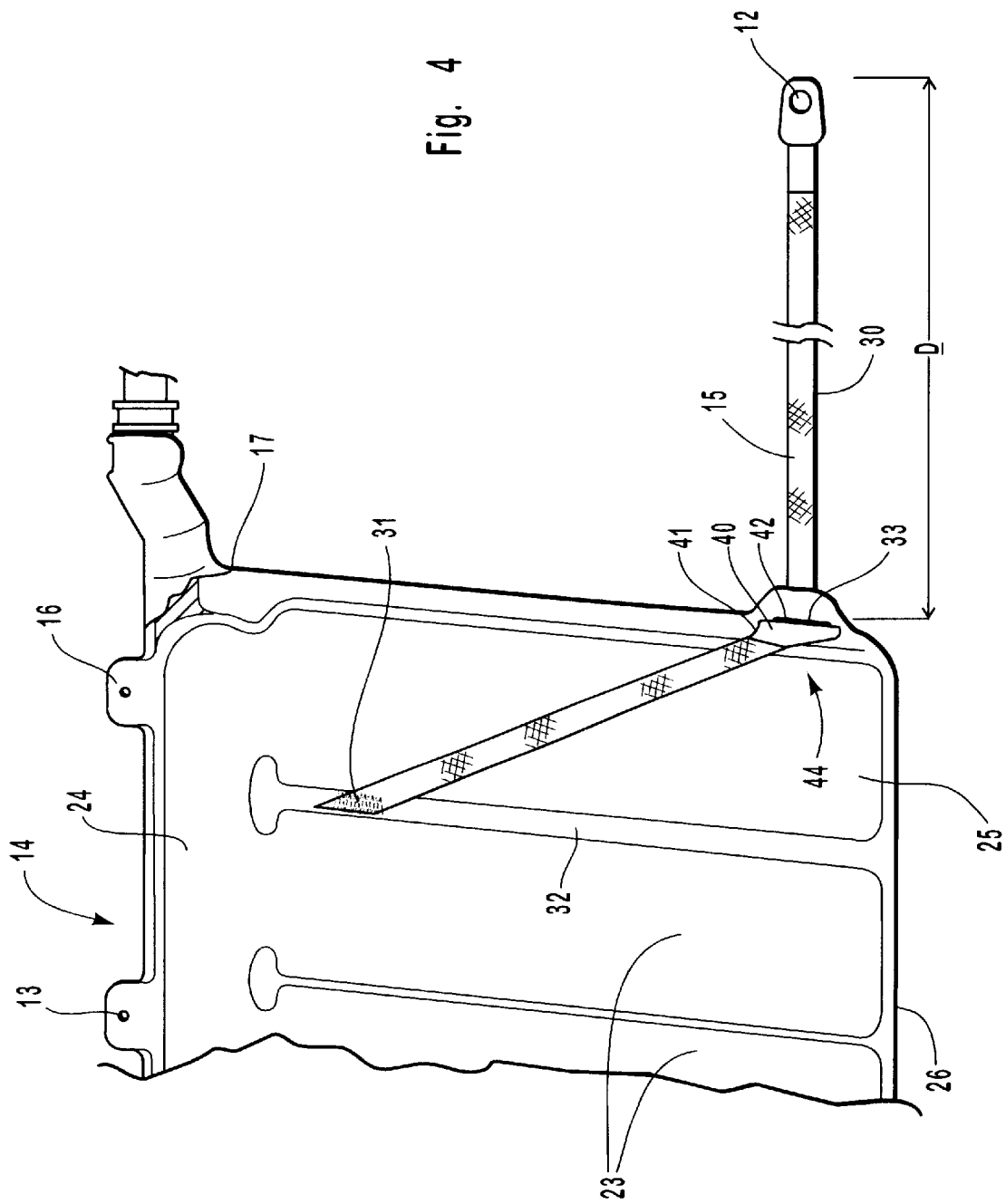
FIG. 4 is a view corresponding to FIG. 3, illustrating a modified embodiment of the invention.

It is to be noted that in an alternative embodiment, shown in FIG. 4, the strap 30 includes a catching portion 44 that is adjacent the guide 33 when the inflatable element 14 is in the fully inflated condition. The catching portion is shown in FIG. 4 as a lateral projection 40. The lateral projection has a sloping edge 41 on the part of the projection facing towards the end of the strap 31 secured to the seam 32, and the projection has a transverse edge 42 on the side of the projection facing towards the end of the strap 30 connected to the point 12 on the "A"-Post 5 of the motor vehicle 1.

It is to be appreciated that when the air-bag is in the initial folded condition, part of the strap 30 is accommodated within the guide 33. On inflation of the inflatable element 14, part of the strap slides through the guide. Because the leading, sloping edge 41 of the lateral projection 40 is of an inclined form, that part of the projection may be drawn through the guide 33 as the bag inflates. However, subsequently the lateral projection 40 cannot pass back through the guide, since the total width of projection 40 is greater than the width of the guide. If there is any tendency for the lateral projection to pass back through the guide, the transverse edge 42 of the projection catches the part of the inflatable element 14 adjacent the guide to prevent movement of this type.

Figure 5:
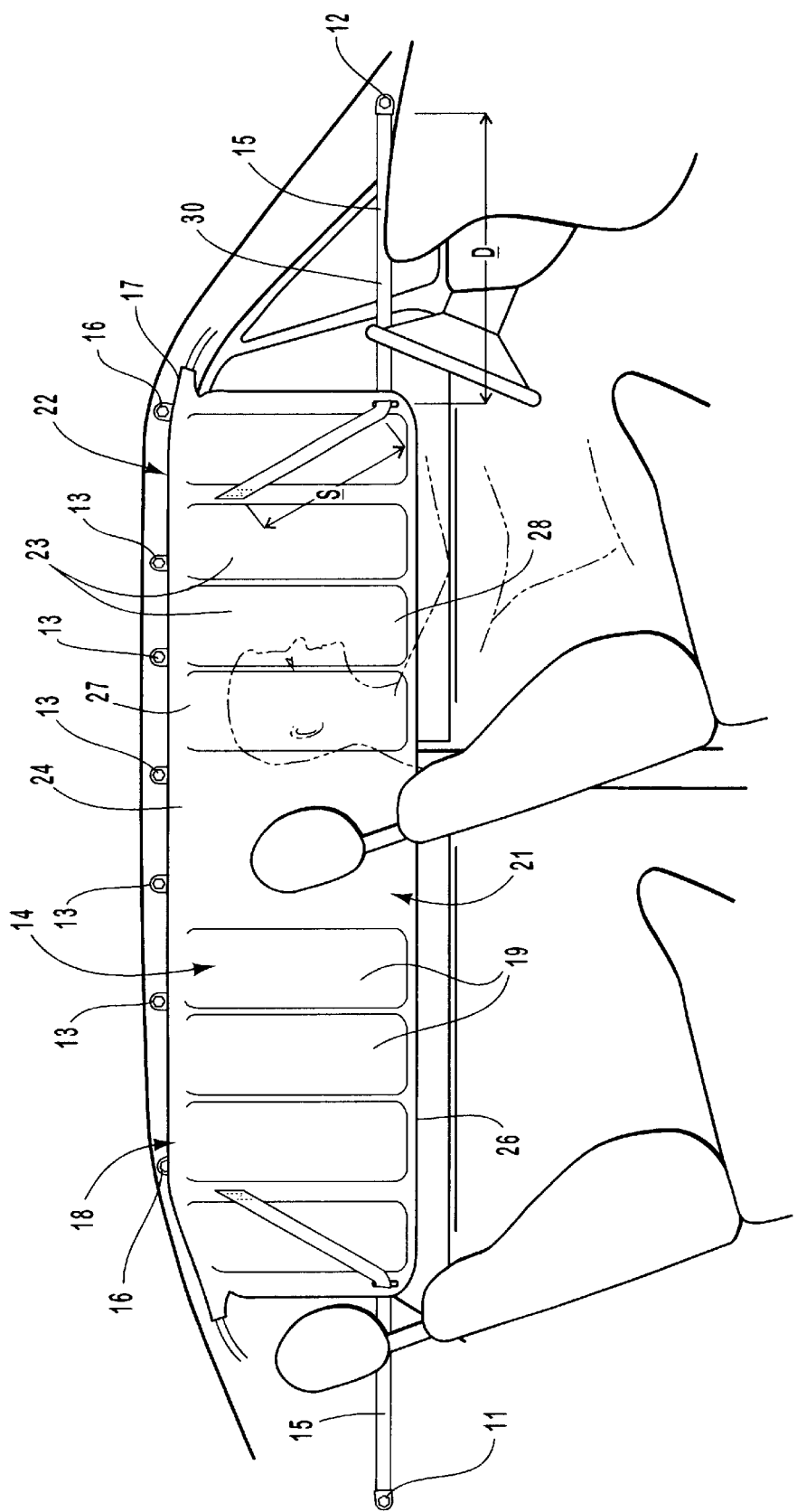
FIG. 5 is a view corresponding to FIG. 2, showing a modified embodiment of the invention.

Whilst a particular form of tether 15 has been shown only at one end of the inflatable element 14, it is to be understood that a second tether of this type could be provided so that there are substantially identical tethers at opposed ends of the inflatable element 14. As shown in FIG. 5, the forward and rearward ends of the inflatable element are provided with tethers 15,15. Both tethers 15,15 have first ends that are secured to parts of the inflatable element adjacent the upper region 27. Additionally, both tethers pass through guides as they extend in opposing directions to points 12, 11 on the "A" and "C"-Posts. As can be seen in FIG. 5, the tether arrangements at the opposed ends of the inflatable element are substantially identical and perform substantially the same function.

What is claimed is:

1. An air-bag arrangement for use in a motor vehicle, the arrangement comprising:
    an inflatable element comprising
        an inflatable part,
        an edge part,
        an upper region, and
        a lower region;
    connectors to secure the edge part of the inflatable element to the motor vehicle;
    an inflator adapted to inflate the inflatable part of the inflatable element; and
    a tether arrangement comprising:
        an elongated tether having first and second ends thereof, wherein the first end is secured to a part of the inflatable element adjacent the upper region of the inflatable element, and wherein the second end is secured to the motor vehicle,
        a guide located adjacent one end of the inflatable element and adjacent the lower region of the inflatable element, the tether passing movably through the guide; and
        a catching portion adapted to permit the tether to move through the guide in one direction and to prevent the tether from moving through the guide in an opposite direction.

2. An air-bag arrangement according to claim 1 wherein the inflatable part of the inflatable element comprises a plurality of discrete inflatable cells.

3. An air-bag arrangement according to claim 1 wherein the inflator comprises a gas generator and a fill tube adapted to communicate with the inflatable part of the inflatable element.

4. An air-bag arrangement according to claim 1 wherein the connectors comprise anchoring tabs.

5. An air-bag arrangement according to claim 2 wherein the guide comprises a slit formed in the lower region of the inflatable element, and wherein the tether passes through the slit, the tether and slit being so dimensioned that the tether may slide though the slit.

6. An air-bag arrangement according to claim 2 wherein the guide comprises a loop of material formed in the lower region of the inflatable element, and wherein the tether passes through the loop, the tether and loop being so dimensioned that the tether may slide through the loop.

7. An air-bag arrangement according to claim 1 wherein the catching portion comprises a laterally outward extending projection fanned on one side of the tether.

8. An air-bag arrangement according to claim 1 wherein the air-bag arrangement is mounted within a motor vehicle, and wherein the connectors and the second end of the tether are secured to the motor vehicle at points extending along a non-linear line located above an opening in the vehicle, the second end of the tether being secured to the vehicle at a point located adjacent one end of the non-linear line.

9. An air-bag arrangement according to Claim 8 wherein the inflatable element and tether arrangement are so adapted such that when the inflatable element is inflated the inflatable element is sufficiently rigid to prevent a driver or occupant of the motor vehicle from passing through the opening in the vehicle.

10. An air-bag arrangement according to claim 8 wherein when the inflatable element is inflated, a lower region of the inflatable element and the tether extend between two opposed ends of the non-linear line and are substantially taut.

11. An air-bag arrangement according to claim 8 wherein the inflator is adapted to inflate the inflatable part when the motor vehicle is in an accident.

12. An air-bag arrangement according to claim 1 wherein the tether arrangement is located at the forward-most end of the air-bag, and further comprising a second, substantially identical tether arrangement located at the rearward end of the air-bag.

13. An air-bag arrangement provided in a motor vehicle, the air-bag arrangement comprising:

an initially folded inflatable element having an edge secured to said motor vehicle, an inflatable part, an upper region, and a lower region;

an inflator adapted to inflate the inflatable part of the inflatable element; and a tether, the tether having first and second ends thereof, wherein the first end is secured to the inflatable element at a point adjacent the upper region of the inflatable element and the second end is secured to the motor vehicle, wherein the tether passes movably through a guide mounted adjacent the lower region of the inflatable element, and wherein the tether comprises a catching portion adapted to permit the tether to move through the guide in one direction and to prevent the tether from moving through the guide in an opposite direction;

wherein the air-bag arrangement is such that, on inflation of the inflatable element, the guide adjacent the lower region of the inflatable element will move to a position that pulls the tether into a non-linear condition, thereby stretching the tether taut, so that the lower region of the inflatable element is substantially taut.

14. An air-bag arrangement according to claim 13 wherein the inflatable element and tether are so adapted such that when the inflatable element is inflated, the inflatable element is sufficiently rigid to prevent a driver or occupant of the motor vehicle from passing through the opening in the vehicle.

15. An air-bag arrangement according to claim 13 wherein the inflatable part of the inflatable element comprises a plurality of discrete inflatable cells.

16. An air-bag arrangement according to claim 13 wherein the inflator comprises a gas generator and a fill tube adapted to communicate with the inflatable part of the inflatable element.

17. An air-bag arrangement according to claim 13 wherein the inflator is adapted to inflate the inflatable part of the inflatable element when the motor vehicle is in an accident.

18. An air-bag arrangement according to claim 13 wherein the guide comprises a slit in the lower region of the inflatable element, and wherein the tether passes though the slit, the tether and slit being so dimensioned that the tether may slide through the slit.

19. An air-bag arrangement according to claim 13 wherein the guide comprises a loop of material formed in the lower region of the inflatable element, and wherein the tether passes through the loop, the tether and loop being so dimensioned that the tether may slide through the loop.

20. An air-bag arrangement according to claim 13 wherein the catching portion comprises a laterally outward extending projection fanned on one side of the tether.

21. An air-bag arrangement according to claim 13 wherein the tether is located at the forward-most end of the air-bag, and further comprising a second and identical tether located at the rearward end of the air-bag.

22. An air-bag arrangement for use in a motor vehicle, the arrangement comprising:

an inflatable element comprising a guide, a first inflatable cell, a second inflatable cell, and a non-inflatable portion;

connectors for securing the inflatable element to the motor vehicle;

an elongated tether comprising a first end and a second end, wherein the first end is secured to an upper portion of the non-inflatable portion of the inflatable element between the first inflatable cell and the second inflatable cell, wherein the second end is secured to the motor vehicle, and wherein the tether passes movably through the guide;

wherein, following inflation of the inflatable element, a portion of the tether extends in a downward diagonal manner from the first end to the guide, and a lower region of the inflatable element is substantially taut.

* * * * *